May 9, 1944.  W. H. KRAUSE  2,348,348
HOOD CLOSURE SUPPORTING MEANS
Filed Jan. 20, 1943  2 Sheets-Sheet 1
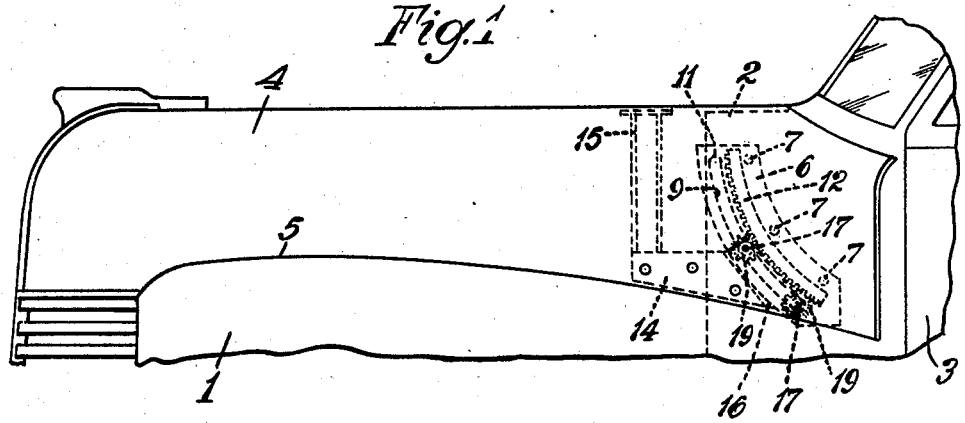
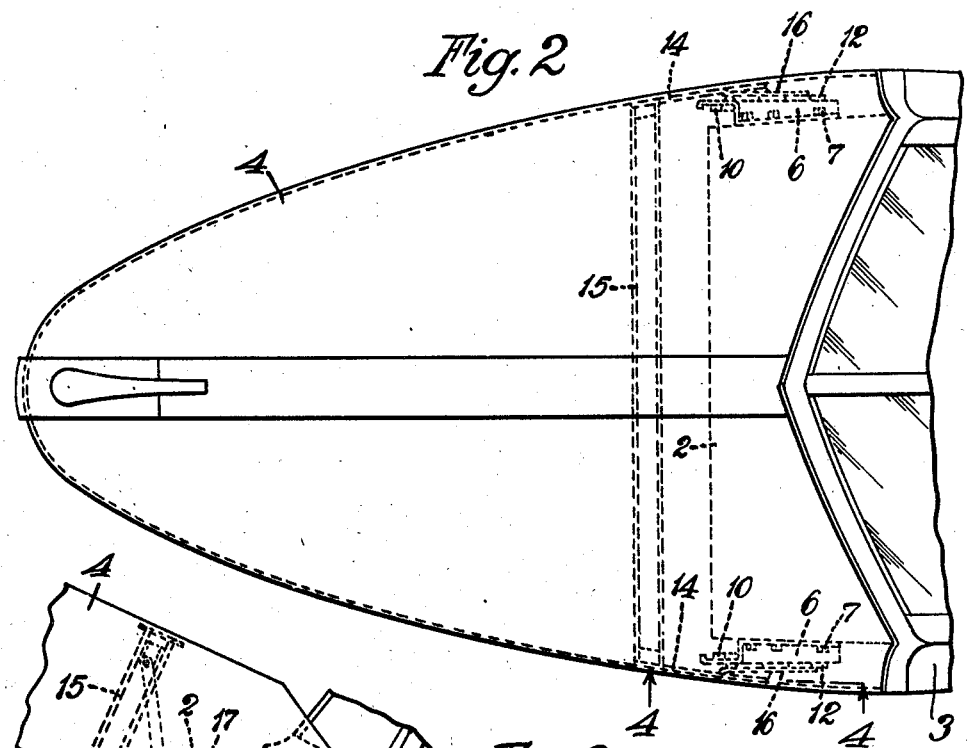
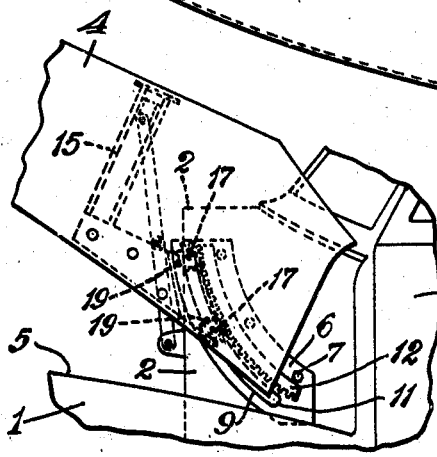
Inventor
Walter H. Krause
by Parker Carter
Attorneys

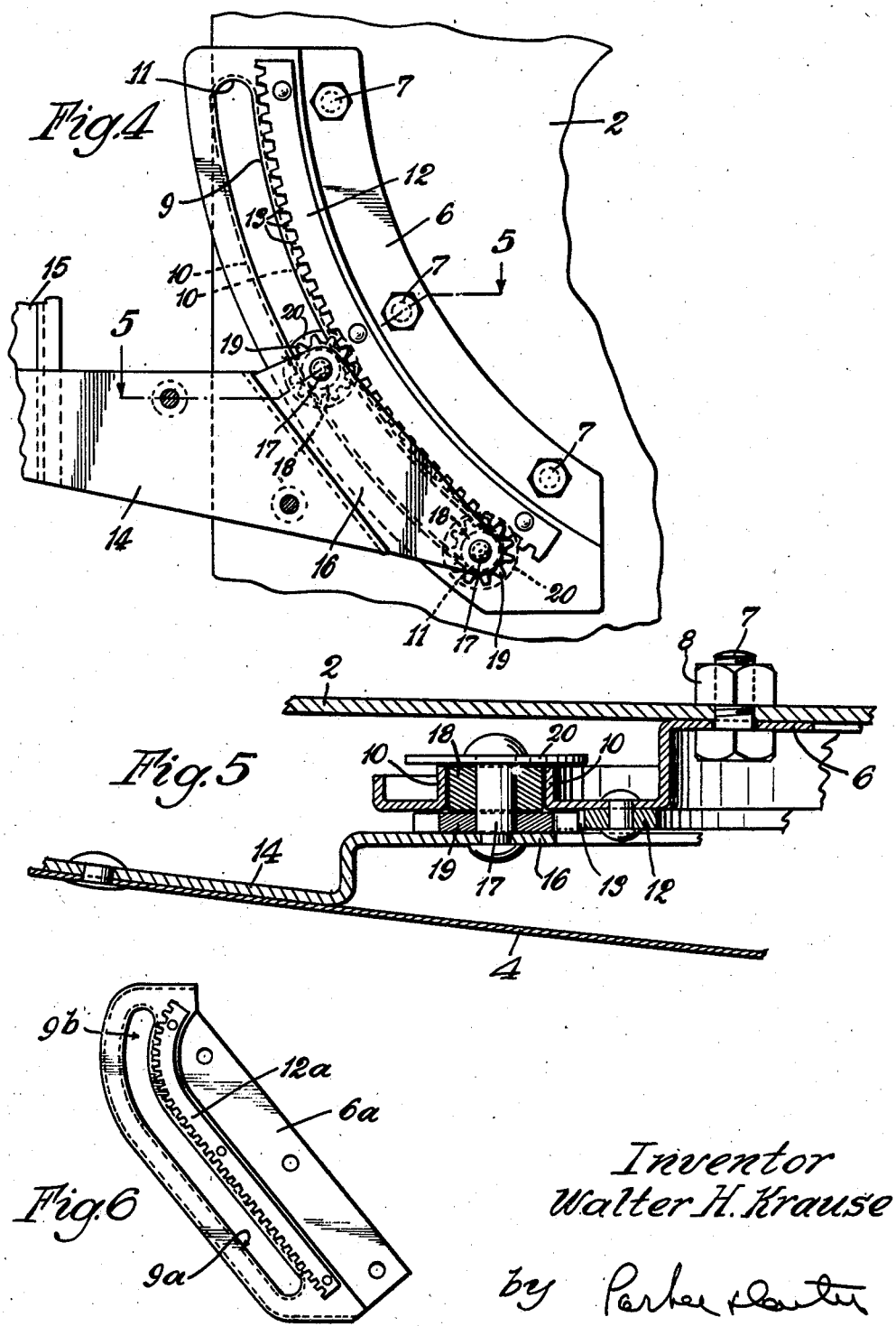
May 9, 1944.  W. H. KRAUSE  2,348,348
HOOD CLOSURE SUPPORTING MEANS
Filed Jan. 20, 1943  2 Sheets-Sheet 2
Inventor
Walter H. Krause Patented May 9, 1944

2,348,348

UNITED STATES PATENT OFFICE 2,348,348

HOOD CLOSURE SUPPORTING MEANS

Walter H. Krause, Chicago, Ill., assignor to Chicago Forging & Manufacturing Co., Chicago, Ill., a corporation of Illinois Application January 20, 1943, Serial No. 472,954

9 Claims. (Cl. 16—128.1)

This invention relates to an improvement in hinge means or movable supporting connections between an automobile hood closure and the vehicle.

One purpose is the provision of improved connecting means between closure and vehicle which shall render the conventional hinge connection unnecessary.

Another purpose is the provision of an improved guiding and supporting connection between hood closure and vehicle which shall permit precise control of the path of movement of the closure when it is moving between open and closed position.

Another purpose is the provision of an improved connection which shall provide a minimum of friction and necessitate the employment of a minimum force in raising and lowering the hood closure.

Other purposes will appear from time to time throughout the specification and claims.

The invention is illustrated more or less diagrammatically in the accompanying drawings, wherein—

Figure 1 is a side elevation of the fore part of the vehicle when the closure is in closed position, with the enclosed parts indicated in dotted lines;

Figure 2 is a plan view of the structure shown in Figure 1 with the interior parts indicated in dotted lines;

Figure 3 is a partial side elevation with the hood closure in raised position;

Figure 4 is a section on an enlarged scale on the line 4—4 of Figure 2;

Figure 5 is a section on an enlarged scale on the line 5—5 of Figure 4; and

Figure 6 illustrates the bearing parts of a variant form of the device.

Like parts are indicated by like symbols throughout the specification and drawings.

Referring to the drawings, 1 generally indicates the hood of a vehicle, such as an automobile. The cowl is indicated as at 2. 3 indicates generally the body portion of the vehicle. 4 indicates the hood closure of the vehicle, 5 indicating its lower edge at its junction or engagement with the opposed part of the hood 1. It will be understood that any suitable hood latch means may be employed, not herein shown, for locking the closure 4 in closed position and for permitting it to be raised at the will of the operator. It will be understood that any conventional hood latch means may be employed, for example, adjacent the forward end of the closure 4.

Located at each side of the cowl 2 is a bearing plate generally indicated as 6. It may be secured to the cowl by any suitable securing means, for example, the bolts 7 and the nuts 8. It will be understood, of course, it may be riveted or otherwise secured. The member is shown, for example in Figure 4, as generally arcuate and as being provided with an arcuate slot 9, having inwardly turned equidistant flanges 10, whereby a species of arcuate track is formed, closed at the ends, as at 11. Located adjacent the track slot 9 is a fixed arcuate rack 12, having teeth 13 on the edge closest to the track slot 9.

Mounted at each side of the inner face of the hood closure 4 is a bracket member 14, which may be welded, bolted, or otherwise secured to the inner face of the hood closure. The bracket member 14 may, if desired, be secured to any suitable transversely extending reinforcement 15, extending across the closure 4. Each such member 14 has a rearwardly extending portion 16, which when employed with a hood closure of the proportions shown in the present application may be spaced inwardly from the inner face of the closure 4, as shown in Figure 5. It will be understood of course, that the proportions and shape both of the closure 4 and of the bracket member 14 may be widely varied and may under some circumstances be practical or desirable to have all parts of the bracket 14 abut against the inner face of the hood closure 4. However, the form as herein shown is practical.

Mounted on each portion 16 are a plurality of spaced bearing pins 17, herein shown as two in number. Freely rotatable on each of the pins 17 is a roller 18, and a pinion 19. An end plate or washer 20 may be mounted on each of the pins 17 and engages the inner edges of the flanges 10 in a guiding relation. It will be understood that the rollers 18 penetrate and ride in the track slot 9 and serve as guiding and supporting means and also as friction reducing means. The pinions 19 are in mesh with the teeth 13 of the rack 12, and render the relative movement of the parts easier and also assist in holding the parts against unintended movement at the time when force is not being applied to the closure.

Any suitable additional means interposed between the closure 4 and the vehicle, or for example the cowl 2, may be employed for holding the hood positively in raised position and for reducing the force necessary for positively lifting the closure. Since such means does not form part of the present invention, and since a wide variety of such means may be employed, such means will not be described herein.

Referring to Figure 6, there is illustrated a modified form in which the guide slot in the bearing plate 6a corresponding with the slot 9 in Figure 4 is provided with the separate portion 9a terminating in an arcuate portion 9b. The rack 12a is correspondingly shaped. It will be understood that the profile of the rack 12a and the corresponding path of movement of rollers engaging the slot 9 or 9a, 9b may be substantially varied to suit the needs of the particular structure. It will be understood, for example, that the parts are so proportioned that the rear edge of the closure 4, in the course of the lifting movement, is lifted free from the cowl or from the adjacent parts of the vehicle so that there is no contact or wear. However, the parts are so proportioned that, when the closure is in the closed position in which it is shown in Figure 4, it snugly engages and is drawn down about the cowl 2 and the adjacent portions of the vehicle.

It will be further understood that, whereas the employment of the rack is desirable, the slot and roller connections or a slow sliding connection of any suitable type may be employed. The use of the rack and pinion connection and the rollers, however, is practical and useful, and a more satisfactory result is obtained.

It will be realized that, whereas I have described and illustrated a practical and operative device, nevertheless many changes may be made in the size, shape, number and disposition of parts without departing from the spirit of my invention. I therefore wish that the description and drawings be taken as in a broad sense illustrative or diagrammatic, rather than as limiting me to my precise showing.

In particular, it will be understood that, whereas I have shown in Figure 4 a curvilinear or arcuate track, and in Figure 6 a track, part straight and part curvilinear, I may employ a wide variety of track contours, preferably at least in part curvilinear, or with an upper portion at a different effective angle to the horizontal than the lower portion, in order that the forward end of the closure 4, regardless of the particular formation or contour of the track, can be raised in relation to the rear end, as shown for example in Figure 3. It will be understood also that I may employ a wide variety of means for holding the hood in raised position or for assisting in raising the hood.

The use and operation of my device are as follows:

The present invention relates to an improved hinging means for automobile hood closures. As it has been customary in the past to employ more or less hinge structures, the substitute herein described and claimed, namely a slot and roller connection, preferably accompanied with a rack and pinion connection, constitutes an efficient solution of the hinging problem and provides means for permitting the hood quickly and easily to be raised and lowered into and out of closing position. Furthermore, the slot and roller connection, particularly in combination with the rack and pinion connection, very efficiently holds the rear edge of the closure snugly against the top of the cowl. Any unintended raising or bouncing or play of the rear portion of the closure is prevented.

It will be observed from Figures 4 and 6, that both the slot and roller connection and the accompanying rack and pinion connection are curved or inclined away from the vertical. The upper surface of the slot and the rack overlie the rollers and the pinions. When any suitable locking means is employed for locking the front end of the hood in place, this overhang of the slot and the rack is an effective means for holding the rear edge of the hood firmly in place. The parts are, of course, so designed and proportioned that, when the front end of the hood is in closed position, the rear edge of the hood snugly engages the cowl which it overlies.

When the hood is in closed position, with the front end locked, the rack and pinion device holds the rear end or edge of the hood firmly against bouncing out of position. This is one of the difficulties which the hinges previously employed have not altogether solved. In fact, even with the present structure, if the rack and pinion connection is omitted, the rollers in the slot may tend to move too freely and may allow some bouncing out of position which is prevented when the rack and pinion connection is added. Furthermore, the presence of the rack and pinion connection definitely aids in maintaining the hood in full raised or in any intermediate position.

As will appear in Figure 3, the slot and the rack are so proportioned and positioned that as the hood is tilted into open position, the rear edge of the hood is withdrawn somewhat from the cowl, and does not engage the cowl, as the hood is raised or lowered. The employment of the rack and slot which can be shaped to suit the particular size and shape of hood employed, frees the designer from the necessity of employing complicated and generally compound hinge levers. In the past, the designing of such hinge levers in order to prevent contact between the rear edge of the closure and the cowl has been a difficult problem. This has resulted in the employment of frequently quite complicated hinge structures. In the present invention the slot and its associated rack may be arcuate or partly arcuate and may in a real sense be "tailored" to suit the particular job.

I claim:

1. A concealed hinge for a horizontally hinged closure element, which includes a plurality of fixed abutments, spaced laterally apart and lying in parallel, generally vertical planes, each such abutment including a generally arcuately slotted guide member and a rack having a profile substantially the same as the slot of said guide member, a closure support including a member movable in relation to each said abutment, each said member including an element penetrating one of said slots and a rotatable pinion in mesh with the rack associated with such slot, the center of the pinion coinciding with the slot penetrating element, and a closure mounted on and movable unitarily with said closure support.

2. A concealed hinge for a horizontally hinged closure element, which includes a plurality of fixed abutments, spaced laterally apart and lying in parallel, generally vertical planes, each such abutment including a generally arcuately slotted guide member and a rack having a profile substantially the same as the slot of said guide member, a closure support including a member moveable in relation to each said abutment, each said member including an element penetrating one of said slots and a rotatable pinion in mesh with the rack associated with such slot, the center of the pinion coinciding with the slot penetrating element, and a closure mounted on and movable unitarily with said closure support, one end of the slot of said member being substantially lower than the other end and constituting the lowest part of the slot.

3. A concealed hinge for a horizontally hinged closure element, which includes a fixed abutment lying in a generally vertical plane, said abutment including a slotted guide member, one end of the slot of said guide member being substantially lower than the other end and constituting the lowest part of the slot, a closure support including an element penetrating said slot, a rack fixed in relation to said abutment and extending along said slot and having substantially the same profile, and a pinion rotatable on said closure support, in mesh with said rack, the center of said pinion intersecting said slot at all positions of the closure support, and a closure on said closure support.

4. A concealed hinge for a horizontally hinged closure element, which includes a fixed abutment lying in a generally vertical plane, said abutment including a slotted guide member, one end of the slot of said guide member being substantially lower than the other end and constituting the lowest part of the slot, a closure support including an element penetrating said slot, a rack fixed in relation to said abutment and extending along said slot and having substantially the same profile, and a pinion rotatable on said closure support, in mesh with said rack, the center of said pinion intersecting said slot at all positions of the closure support, and a closure on said closure support, said slot including a generally arcuate portion.

5. A concealed hinge for a horizontally hinged closure element, which includes a fixed abutment lying in a generally vertical plane, said abutment including a slotted guide member, one end of the slot of said guide member being substantially lower than the other end and constituting the lowest part of the slot, a closure support including an element penetrating said slot, a rack fixed in relation to said abutment and extending along said slot and having substantially the same profile, and a pinion rotatable on said closure support, in mesh with said rack, the center of said pinion intersecting said slot at all positions of the closure support, and a closure on said closure support, said slot including a generally arcuate portion, and a non-arcuate portion continuous therewith.

6. A connection between a plurality of relatively movable parts, including a slotted member fixed in relation to one of the parts, an opposed member fixed to the other of said parts, a slot penetrating member mounted on the opposed member and penetrating the slot of the slotted member, a rack fixed in relation to the slotted member and conforming to the slot in contour of edge, and a pinion rotatably mounted on the opposed member, and in mesh with said rack.

7. A connection between a plurality of relatively movable parts, including a slotted member fixed in relation to one of the parts, and a rack, parallel with the slot of the slotted member, fixed in relation to one of the parts, an opposed member fixed to the other of said parts, a plurality of members mounted on the opposed member, each such member including a portion penetrating a slot of the slotted member and a rotatable pinion portion in mesh with the rack, and co-axial with the slot penetrating portion.

8. A connection between a plurality of relatively movable parts, including a slotted member fixed in relation to one of the parts, and a rack, parallel with the slot of the slotted member, fixed in relation to one of the parts, an opposed member fixed to the other of said parts, a plurality of members mounted on the opposed member, each such member including a portion penetrating a slot of the slotted member and a rotatable pinion portion in mesh with the rack, and co-axial with the slot penetrating portion, said slot being generally arcuate.

9. A connection between a plurality of relatively movable parts, including a slotted member fixed in relation to one of the parts, and a rack, parallel with the slot of the slotted member, fixed in relation to one of the parts, an opposed member fixed to the other of said parts, a plurality of members mounted on the opposed member, each such member including a portion penetrating a slot of the slotted member and a rotatable pinion portion in mesh with the rack, and co-axial with the slot penetrating portion, one end of said slot being lower than the other end and constituting the lowest portion of the slot, the slotted member lying in a generally vertical plane.

WALTER H. KRAUSE.